Patented Oct. 6, 1942

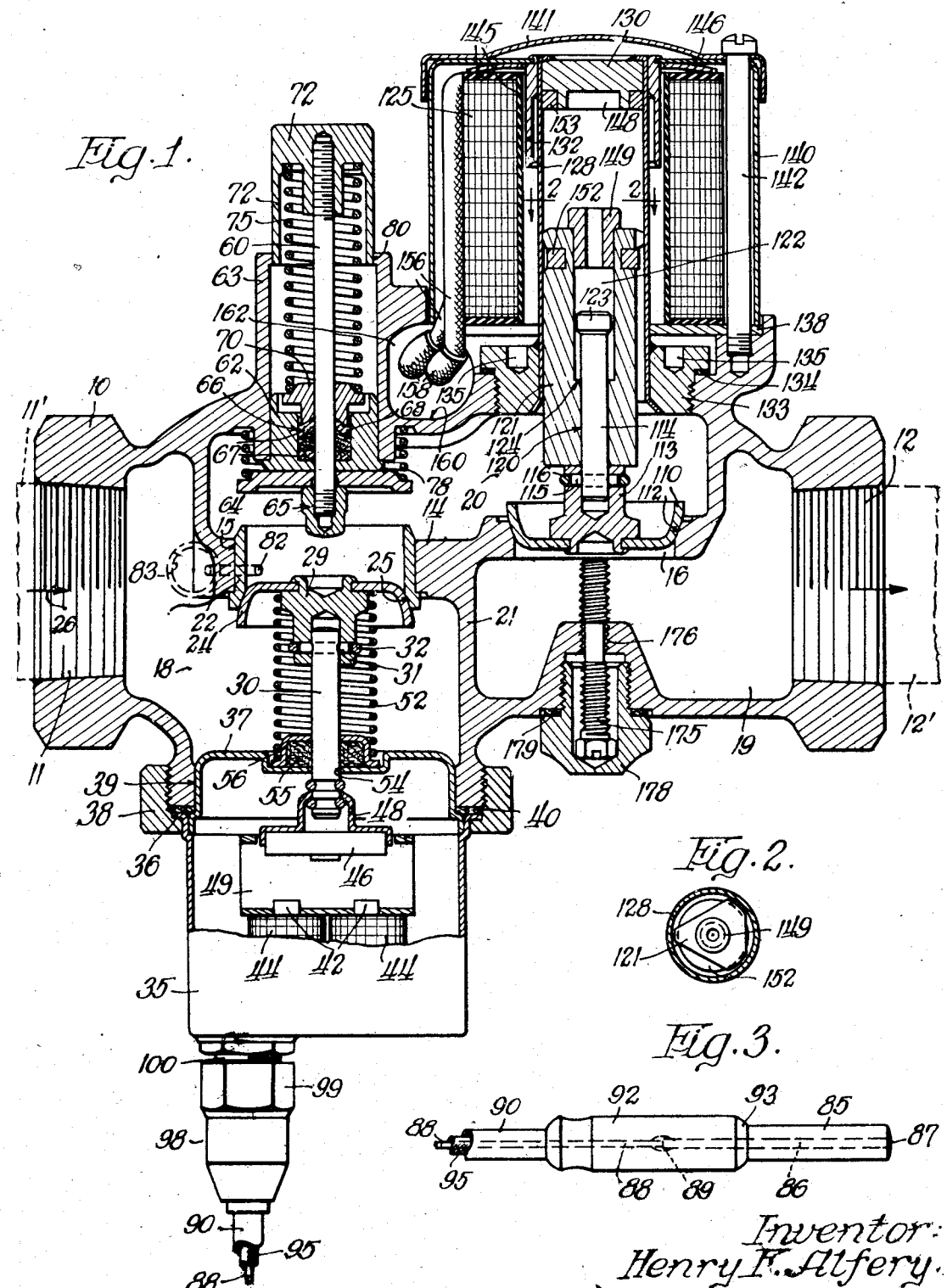

2,297,854

UNITED STATES PATENT OFFICE 2,297,854

COMBINED THERMOELECTRIC SAFETY SHUT-OFF AND ELECTRORESPONSIVE VALVE

Henry F. Alfery, Milwaukee, Wis., assignor to Milwaukee Gas Specialty Company, Milwaukee, Wis., a corporation of Wisconsin Application November 9, 1939, Serial No. 303,602

7 Claims. (Cl. 158—117.1)

This invention relates to safety shutoff devices for heating and other apparatus, and has particular reference to a combined thermoelectric safety shutoff and electroresponsive valve.

One of the main objects of my invention is to provide a combined thermoelectric safety shutoff and electroresponsive valve which is operable automatically to shut off the supply of fuel for a burner whenever, for instance, a pilot light or other flame is extinguished, and having also electroresponsive means for shutting off the fuel supply upon opening of the circuit for the electroresponsive part of the device. The opening and closing of this circuit may be done, for instance, by a manually controlled switch, or automatically by a switch controlled by an abnormal, defective, or insufficient functioning or non-functioning of the apparatus, such as a switch controlled by a thermostat subject to the temperature of the water in the tank of a water heater or subject to the temperature of a room or other space heated by the apparatus, or by a pressure switch controlled, for instance, by the pressure of the water in the tank of a water heater.

Another and more specific object of my invention is to provide a combined thermoelectric safety shutoff and electroresponsive valve having (1) an electromagnet and a thermocouple connected in circuit with the electromagnet and placed in position to be heated by a pilot light or other flame, which thermoelectric safety shutoff is adapted automatically to shut off the supply of gas or other fuel, for instance to the burner, upon extinguishment of the flame to the heat of which the thermocouple is subjected, and having (2) in combination with such thermoelectric safety shutoff, an electroresponsive valve of the character set forth.

The thermoelectric safety shutoff has an armature which, when attracted, maintains the thermoelectrically controlled valve open and leaves the device under the control of the electroresponsive valve, and when retracted, compels closing of the thermoelectrically controlled valve to shut off the supply of fuel regardless of the electroresponsive valve. On the other hand, the electroresponsive valve, when in operating position, leaves the device under the control of the thermoelectrically controlled valve, and upon movement to closed or safety position, shuts off the supply of fuel regardless of the thermoelectrically controlled valve.

Another object of my invention is to provide an improved construction and arrangement of the thermoelectrically controlled and electroresponsive valves, which improved construction and arrangement of these valves provide a device which is operable to achieve the results herein set forth.

It is also an object of my invention to provide a combined thermoelectric safety shutoff and electroresponsive valve of unitary and relatively simple and inexpensive construction, and which may be installed and operated conveniently; also a device of this character which is adapted for convenient and expeditious manufacture and assembly, and which will operate quietly and without vibration and effectively for the purposes intended.

The device also preferably includes means for setting the electroresponsive valve in open position.

Another object of my invention is to provide an improved pilot fuel supply connection which is arranged so that the supply of fuel to the pilot burner is shut off only by the closing of the thermoelectric safety valve, this pilot fuel supply connection maintaining the supply of fuel to the pilot burner regardless of the electroresponsive valve. This aspect of the invention may vary widely within the scope of the appended claims.

Further objects and advantages of the invention will be apparent from the following detailed description, taken in connection with the accompanying drawing in which:

Figure 1 is a vertical section through a combined thermoelectric safety shutoff and electroresponsive valve embodying the present invention;

Figure 2 is a detail section taken on the line 2—2 of Figure 1; and

Figure 3 is a fragmentary view showing one suitable and illustrative form of thermocouple for connection in circuit with the electromagnet for the thermoelectrically controlled valve.

The device is shown and described as a combined thermoelectric safety shutoff and electroresponsive valve for shutting off the supply of fuel to the burner, which, for instance, may be the burner for a room, oven, or other space heater, or the burner for a water heater, conversion heater, or any other burner.

The device selected for installation comprises a valve body 10 having a fuel inlet 11 and a fuel outlet 12 which are tapped internally to receive the inlet and outlet pipe sections 11' and 12', respectively. The inlet pipe section receives the fuel from a suitable source of fuel supply, and the outlet pipe section leads to the burner.

The valve body 10 has an internal wall or partition 14 which has a pair of valve openings 15 and 16 through which communication is adapted to be effected between the inlet chamber 18 which is in communication with the inlet 11, and the outlet chamber 19 which is in communication with the outlet 12. This communication between the inlet chamber 18 and the outlet chamber 19 is by way of an intermediate chamber 20. The wall or partition 14 separates the chambers 18 and 19 from the chamber 20, and the chambers 18 and 19 are separated from each other between the openings 15 and 16 by means of a wall or partition 21. The valve opening 15 preferably has a tubular valve seat member 22 fixed therein.

Communication between the inlet chamber 18 and the intermediate chamber 20 through the valve seat 22 is controlled by a valve member 24 shown as of cup-shaped form and as adapted to seat at 25 upon the valve seat 22 preferably in a direction with the flow of gas or other fuel, the arrow 26 indicating the direction of flow of the fuel. The valve member 24 is carried by a valve hub 29 which fits telescopically over the inner end of the valve stem 30 and is secured thereto by a pin 31. The pin 31 is held in place by an annular spring snap ring 32.

The hood and cup assembly which encloses the electromagnet and armature for the thermoelectrically controlled valve 24 comprises a hood 35 which, in the illustrated embodiment of the invention, is of generally cylindrical and cup-shaped form provided at its inner end with an external flange 36. A metal shell or cup 37 has pressed fit or is otherwise suitably secured in the inner end of the hood 35 and encloses and seals the interior of the hood from the deleterious action of the gas or other fuel which passes through the valve body. The hood 35 is clamped to the valve body 10 by a union nut 38, with the hood and cup assembly closing the opening 39 in the valve body 10. A union gasket may be provided as indicated at 40.

The electromagnet, which is sealed within the hood and cup assembly, comprises a magnet frame, the pole ends of which are shown more or less schematically at 42. The form of the magnet frame may vary widely within the scope of the present invention. The electromagnet coil 44 surrounds the legs of the magnet frame, and the lead terminals of the coil are connected in circuit with the thermocouple as will presently appear.

The armature 46 is disposed within the hood and cup assembly, and is also sealed from the gaseous or other fuel by this hood and cup assembly. The armature 46 is shown as secured to the outer end of the valve stem 30 by a cradle or connection means 48 and is guided for reciprocatory movement by suitable guide means 49. This may vary widely. The armature 46 is adapted to be held in attracted position against the pole ends of the magnet frame as long as the electromagnet is energized by the heat of the flame upon the thermocouple. Upon extinguishment of the flame, the electromagnet becomes deenergized, or at least not sufficiently energized to hold the armature 46 in attracted position, whereupon the spring 52 compels the valve 24 to closed position and the armature 46 to retracted position.

The attachment of the armature 46 to the stem 30 may, if desired, be sufficiently loose or of a character to permit a generally universal movement of the armature on the stem 30 so that it may accommodate itself to the pole ends of the magnet frame. The fit of the armature in the guide means 49 is also preferably of a character to permit this result. The stem 30 extends for reciprocatory movement through an opening 54 in the central depressed portion of the base of the cup 37, and the opening 54 is sealed by packing indicated at 55. The spring 52 is coiled about the stem 30 and interposed between the valve member 24 and a flange on the cup-shaped washer 56, the spring 52, in addition to compelling the valve 24 to closed position and the armature 46 to retracted position upon extinguishment of the flame, serves also to compress and hold the packing 55 in tight sealing relation about the stem 30 and adjacent the opening 54.

In view of the inability of the relatively weak or feeble thermoelectric current to actuate the armature from retracted position to attracted position and, with it, the valve 24 from closed to open position, the device is provided with reset means. This reset means comprises a reciprocatory reset stem 60 which is disposed coaxial with the stem 30 and is guided in a reset stem guide 62. The guide 62 has pressed fit or is otherwise secured in a tubular boss 63 integral with the valve body 10.

The stem 60 extends centrally through a flow interrupter disc 64 and has a reset stem nut 65 threaded or otherwise secured upon its inner end. The guide 62 is recessed at 66, and fitting within this recess are a pair of gaskets 67 between which an asbestos or other suitable packing 68 is disposed. The reset stem 60 has reciprocatory movement through the inner end of the guide 62, also through the gasket 67 and packing 68, and through a packing gland 70. The inner end of the gland 70 fits into the recess 66, and a reset button 72 is threaded or otherwise suitably secured upon the outer end of the reset stem 60.

For the purpose of normally maintaining the flow interrupter disc 64 in open position, as shown, and the reset button 72 in outwardly projected position, a spring 75 is interposed between the gland 70 and the button 72. This spring 75, which is coiled about the stem 60, performs the added function of maintaining the packing in tight sealing relation about the stem 60 to seal the device against leakage of gas or other fuel along the reset stem. A spring 78 is interposed between the flow interrupter disc 64 and the valve body, and serves to compel the flow interrupter disc 64 inwardly to closed position engaging with the adjacent end of the valve seat 22 when the reset button 72 is pressed inwardly to reset the valve 24 to open position and the armature 46 to attracted position. Engagement of the flow interrupter disc 64 with the valve seat 22 shuts off the supply of fuel during the resetting operation, upon completion of which the reset stem 60 is projected outwardly to the position shown, thereby actuating the flow interrupter disc 64 to open position. The reset button 72 may be guided, for instance, at 80 in the outer end of the tubular boss 63.

Two pilot supply ports, only one of which is shown at 82, open outwardly from the passage or opening defined by the valve seat 22 between the valve seating end upon which the flow interrupter disc 64 seats and the valve seating end upon which the valve 24 seats. The outer ends of these ports 82, which are cored through the valve body, are disposed diametrically opposite each other and have threaded openings so that a pilot fuel supply tube may be connected to either port 82. The other port is closed by a removable screw or plug 83.

With the pilot supply ports 82 positioned as shown, it will be apparent that a supply of fuel is set up to the pilot burner as long as the valve 24 is in open position, and that when the valve 24 closes, it not only shuts off the supply of fuel to the main burner but also the supply of fuel to the pilot burner. As the valve 24 is moved to open position in the resetting operation, the flow interrupter disc seats upon the adjacent end of the valve seat 22 to shut off the supply of fuel to the main burner, but the pilot supply ports 82 being located anterior to the flow interrupter disc 64, a pilot supply of fuel will be set up as soon as the valve 24 is opened and will continue with the flow interrupter disc 64 in closed position so that the pilot burner may be ignited to set up the thermoelectric current for energizing the electromagnet whereby to hold the armature 46 in attracted position before the flow interrupter disc 64 is moved to open position upon release of the reset button 72.

While any other suitable or preferred form of thermocouple or thermopile may be employed within the scope of the present invention, the particular thermocouple shown in the drawing is of the general character disclosed and claimed in Oscar J. Leins Patent No. 2,126,564, granted August 9, 1938. It comprises an outer tubular metallic thermocouple member 85 and an inner metallic thermocouple member 86 joined at one end to the end of the outer thermocouple member 85 to form the thermal junction 87 which is adapted to be placed in position to be heated by the pilot light or any other desired flame. An inner lead conductor 88 is joined to the inner thermocouple member to form an internal thermal junction 89, and an outer tubular lead conductor 90 is connected to the outer thermocouple member 85, for instance through a sleeve 92, to form a third thermal junction 93. The outer lead conductor 90 encloses the inner lead conductor 88, and with the outer thermocouple member and sleeve 92 constitutes an enclosure about the inner thermocouple member and the inner lead conductor and the internal thermocouple junction 89. The inner lead conductor 88 is insulated from the outer lead conductor 90, for instance by a wrapping of insulation on the inner lead conductor as indicated at 95.

One of the lead conductors 88, 90 is connected to one of the terminal leads of the electromagnet coil 44, and the other lead conductor may be connected to the other terminal lead of the coil 44, or may be grounded, for instance, to the hood 35 or any other part of the device, in which case the other terminal lead for the coil 44 will also be grounded to complete the thermoelectric circuit.

The thermocouple leads are preferably connected to the electromagnet of the device by means of a quick detachable connector indicated in its entirety at 98, although this, of course, may vary. The quick detachable connector 98 shown in the drawing is of the general character disclosed and claimed in the copending application of John H. Thornbery, Serial No. 291,131, filed August 21, 1939. The lead extension connector nut thereof is shown at 99, and the threaded metallic connector bushing is shown at 100. The thermocouple leads are disconnected from the device merely by unthreading the connector nut 99 from the bushing 100. An insulating or other protector cap (not shown) may be threaded upon the bushing 100 to cover and protect the terminal connector means on the hood 35 when the thermocouple leads are not connected thereto.

Communication between the intermediate chamber 20 and the outlet chamber 19 through the valve opening 16 is controlled by a valve member 110 shown as of cup-shaped form and as adapted to seat at 112 upon the valve seat surrounding the opening 16 preferably with the direction of flow of the gas or other fuel through the valve body. The valve 110 is carried by a valve hub 113 similar to the valve hub 29, the hub 113 fitting telescopically over the inner end of a solenoid plunger stem 114 and being secured thereto by a pin 115. The pin 115 is held in place by an annular spring snap ring 116.

The particular electroresponsive valve shown in the drawing is in the form of a solenoid valve of the character disclosed and claimed in Theodore A. Wetzel Patent No. 2,111,232, granted March 15, 1938. The particular form of this electroresponsive valve may, however, vary within the scope of the present invention.

The stem 114, which is preferably non-magnetic, is slidable in a bore 120 extending longitudinally through the solenoid plunger or armature 121. The plunger 121 is counterbored at 122 and the stem 114 has a head 123 outwardly beyond the shoulder 124, with the parts positioned as shown. Upon response of the armature to energization of the magnet coil 125, the shoulder 124 in the armature engages the head 123 with an impact or hammer-like blow positively to release the valve 110 from its seat, and thereupon the upward movement of the armature lifts the valve 110 to open position.

The armature 121 is slidable longitudinally in a solenoid guide tube 128 of non-magnetic material, which tube is closed at its upper or outer end by a plug 130 of magnetic metal. The magnet coil 125 surrounds the upper portion of the tube 128 and, upon energization, draws the armature upwardly toward the plug 130. The upward attraction imposed on the armature 121 upon energization of the coil 125 may be augmented by a magnetic or flux sleeve 132 which surrounds the upper end of the tube 128.

The tube 128 is preferably closed and sealed at its outer end, and thereby serves as a sealing tube to prevent leakage from the valve body 10. The lower or inner end of the tube 128 is fixed in a tube support 133 threaded into the valve body 10. A gasket may be provided at 134, and the support 133 has diametrically opposite openings 135 for engagement by a spanner wrench or other tool to screw the support into and out of place. A magnetic or flux washer is provided at 138, and an enclosing hood is provided at 140. The hood is surmounted by a cover 141 which may be in the form of a name plate, and this cover and the hood 140 are held in place by hood retaining screws 142 threaded at their lower ends into the valve body 10. The flux washer 138 is preferably fastened in place by additional screws (not shown), although, if desired, it may be fastened in place by the same screws which fasten the hood 140 in place.

The flux sleeve 132 is shown as carried by the top of the hood 140. Insulation, in the form of an insulating spool, is provided for the coil 125 as indicated at 145, and a suitable wrapping may be provided around the outer periphery of the coil. A spring washer 146 is preferably interposed between the under side of the top of the hood 140 and the outer end of the insulating spool 145. A recess 148 in the under side of the magnetic plug 130 accommodates a solenoid plunger plug 149 secured in the upper end of the armature 121. The plug 149 is preferably non-magnetic, and prevents the armature 121 from directly contacting the plug 130, thereby precluding residual magnetism in the armature from holding the valve 110 open after deenergization of the coil 125.

As shown in Figure 2, the armature 121 comprises a body of magnetic metal of irregular but generally triangular cross section. The unbalanced or eccentric distribution of the mass in the plunger 121 gives the same a relatively low magnetic reluctance along the side of greatest mass, so that upon energization of the coil 125 the armature 121 not only rises to open the valve and to enter the enclosure defined by the magnetic sleeve 132, but is also drawn sidewise and held against the inner surface of the guide tube 128. This hugging of the armature against the inner surface of the guide tube prevents lateral or sidewise vibration and rattling of the armature in the guide tube.

Near its upper end the armature 121 is provided with an encircling shading ring 152 of copper or other suitable metal. The plug 130 is also shown as provided with a shading ring 153 of copper or other suitable metal. It appears that these shading rings positioned as they are aid the magnet coil in maintaining the plug 149 at the upper end of the armature 121 tightly against the plug 130 and thereby against endwise vibration with the rattling which would result. Stability is thereby provided not only laterally, but also in a longitudinal or endwise direction.

The coil 125 has lead terminals 156 extending down along one side of the coil and within the hood 140. These leads, which are shown as insulated, are provided at 158 with insulating tubing and are adapted to be led out laterally from either of the opposite sides of the valve body through an opening 160 cored transversely therethrough. The opposite ends of this opening 160 are internally threaded to receive closure plugs 162, one of such plugs closing the end of the opening from which the coil leads are not extended. The leads 156 are adapted to be connected to any suitable source of current supply, such as a 110-volt circuit or any other suitable circuit. This circuit (not shown) is provided with a manually operable switch or with a switch which may be operated automatically, as, for instance, by an abnormal, defective, or insufficient functioning or non-functioning of the apparatus, such as a switch controlled by a thermostat subject to the temperature of the water in the tank of a water heater, or subject to the temperature of a room or other space heated by the apparatus, or by a pressure switch controlled, for instance, by the pressure of the water in the tank of a water heater. This may vary widely.

The operation of the device is as follows:

When the pilot burner or other flame to the heat of which the thermocouple is subject is extinguished, the electromagnet within the hood 35 is deenergized, or at least the holding action thereof ceases to be sufficient to hold the armature 46 attracted to the poles of the magnet frame and the spring 52 compels the valve 24 to closed position as shown, thereby shutting off the supply of fuel to the main burner and, in the illustrated embodiment of the invention, also shutting off the supply of fuel to the pilot burner. In the movement of the valve 24 to closed position the armature 46 moves to retracted position.

When it is desired to reset the thermoelectric part of the device, the reset button 72 is pressed inwardly. This moves the reset stem nut 65 into engagement with the valve 24, and continued inward movement of the reset stem moves the valve 24 to open position and the armature 46 to attracted position. As the reset stem 60 is pressed inwardly, the flow interrupter disc follows under the action of the spring 78 and seats upon the adjacent end of the seat 15 to shut off the supply of fuel to the main burner during the resetting operation. As soon as the valve 24 is unseated in the resetting operation and regardless of the flow interrupter 64, a supply of fuel is set up through the pilot port 82 to the pilot burner. The pilot burner may be lighted and the heat of the pilot flame upon the "hot" junction 67 of the thermocouple creates a thermoelectric current in the coil 44, energizing the electromagnet and causing the armature 46 to be held positively against the inner end of the magnet frame 42 by magnetic attraction. As a result, when the reset button 72 is released, the spring 75 moves or returns this button to its outwardly projected position and the flow interrupter 64 to open position, and the valve 24 remains held in open position by the attraction of the armature 46.

When the circuit through the coil 125 is closed, the armature 121 is drawn upwardly and actuates the valve 110 to open position where it remains as long as the coil 125 is energized. Upon deenergization of the coil 125, as, for example, upon opening of the manual or automatic switch in the circuit for this coil, the armature 121 is released and drops by gravity, closing the valve 110 with impact or with a hammer-like blow and holding the valve closed as long as the coil 125 is deenergized. The armature 46 of the thermoelectric safety shutoff, when attracted, maintains the thermoelectrically controlled valve open and leaves the device under the control of the electroresponsive valve 110, and when the armature 46 is retracted, it compels closing of the valve 24 regardless of the valve 110. On the other hand, the valve 110, when in open position, leaves the device under the control of the thermoelectrically controlled valve 24, and upon movement to closed or safety position, shuts off the supply of fuel to the main burner regardless of the valve 24.

In the illustrated embodiment of the invention, I show a manual control screw 175 which is adapted to be threaded inwardly into the valve body at 176 to engage the center of the lower end of the valve hub 113 for the purpose of setting the valve 110 in predetermined open position. With this valve set in open position by the screw 175, the device will then operate solely under the action of the thermoelectric control. A control screw cap 178 is threaded into the valve body over the outer end of the screw 175 to close the same, and a gasket may be provided as indicated at 179.

I do not intend to be limited to the precise details shown or described.

I claim:

1. In combination, a valve body having a pair of valve openings therein, a valve controlling one of said valve openings, a second valve controlling the other opening, thermoelectric means including a thermocouple adapted to be subjected to the heat of a flame and controlling said first valve, electroresponsive means subject to the condition of a circuit independent of said thermoelectric means for controlling said second valve, said first valve being positioned anterior of said second valve, fuel supply means for a pilot burner positioned to maintain the supply of fuel to the pilot burner regardless of said second valve and as long as said first valve is open, closing of said first valve shutting off the supply of fuel through the valve opening controlled thereby and also shutting off the supply of fuel to the pilot burner, means for resetting said first valve, and means in position between said first and second valves for shutting off the flow of fuel through the valve opening controlled by said first valve during the resetting operation and without shutting off the supply of fuel to the pilot burner.

2. In a device of the class described, a fuel supply pipe, an electroresponsive valve for controlling the flow of fuel through said pipe, a safety shutoff valve in series with said electroresponsive valve, an electromagnet which, when energized, is adapted to hold said safety shutoff valve open, a pilot burner, a thermocouple subject to the heat of the pilot flame and connected in circuit with said electromagnet to energize same by the heat of the flame on the thermocouple, means for resetting the safety shutoff valve to open position, flow interrupter valve means between said safety shutoff valve and said electroresponsive valve for shutting off the flow of fuel through said pipe in the resetting operation regardless of the position of said electroresponsive valve, and a pilot supply pipe leading from a position between said safety shutoff valve and said flow interrupter valve means for supplying fuel to the pilot burner when the safety shutoff valve is open and the flow interrupter valve is closed in the resetting operation.

3. In a device of the class described, a fuel supply pipe, an electroresponsive valve for controlling the flow of fuel through said pipe, a safety shutoff valve in series with said electroresponsive valve, an electromagnet which, when energized, is adapted to hold said safety shutoff valve open, a pilot burner, a thermocouple subject to the heat of the pilot flame and connected in circuit with said electromagnet to energize same by the heat of the flame on the thermocouple, means for resetting the safety shutoff valve to open position, flow interrupter valve means between said safety shutoff valve and said electroresponsive valve for shutting off the flow of fuel through said pipe in the resetting operation regardless of the position of said electroresponsive valve, a pilot supply pipe leading from a position between said safety shutoff valve and said flow interrupter valve means for supplying fuel to the pilot burner when the safety shutoff valve is open and the flow interrupter valve is closed in the resetting operation, and means for setting the electroresponsive valve in predetermined open position.

4. In a device of the class described, a fuel supply pipe, an electroresponsive valve for controlling the flow of fuel through said pipe, a safety shutoff valve in series with said electroresponsive valve, an electromagnet which, when energized, is adapted to hold said safety shutoff valve open, a pilot burner, a thermocouple subject to the heat of the pilot flame and connected in circuit with said electromagnet to energize same by the heat of the flame on the thermocouple, means for resetting the safety shutoff valve to open position, and flow interrupter valve means between said safety shutoff valve and said electroresponsive valve for shutting off the flow of fuel through said pipe in the resetting operation and regardless of the position of said electroresponsive valve.

5. In a device of the class described, a valve body having inlet, outlet and intermediate chambers, a valve seat member through which said inlet chamber is adapted to communicate with said intermediate chamber, a port through which said intermediate chamber is adapted to communicate with said outlet chamber, a safety shutoff valve biased to a closed position and controlling the flow through said valve seat member, an electromagnet which, when energized, is adapted to hold said valve open, a pilot burner, a thermocouple subject to the heat of the pilot flame and connected in circuit with said electromagnet to energize same by the heat of the flame on the thermocouple, a solenoid valve controlling the flow through the port between the intermediate and outlet chambers, means for resetting the safety shutoff valve to open position, flow interrupter means movable in the resetting operation into engagement with the valve seat member between the inlet and intermediate chambers to shut off during the resetting operation the flow to said intermediate chamber and thereby the flow to said outlet chamber regardless of the position of said solenoid valve, and a pilot supply pipe leading from said valve seat member between the ends thereof for supplying fuel to said pilot burner when the safety shutoff valve is open and the flow interrupter means is closed.

6. In a device of the class described, a valve body having inlet, outlet and intermediate chambers, a valve seat member through which said inlet chamber is adapted to communicate with said intermediate chamber, a port through which said intermediate chamber is adapted to communicate with said outlet chamber, a safety shutoff valve biased to a closed position and controlling the flow through said valve seat member, an electromagnet which, when energized, is adapted to hold said valve open, a pilot burner, a thermocouple subject to the heat of the pilot flame and connected in circuit with said electromagnet to energize same by the heat of the flame on the thermocouple, a solenoid valve controlling the flow through the port between the intermediate and outlet chambers, means for resetting the safety shutoff valve to open position, flow interrupter means movable in the resetting operation into engagement with the valve seat member between the inlet and intermediate chambers to shut off during the resetting operation the flow to said intermediate chamber and thereby the flow to said outlet chamber regardless of the position of said solenoid valve, and a pilot supply pipe leading from said valve seat member between the ends thereof for supplying fuel to said pilot burner when the safety shutoff valve is open and the flow interrupter means is closed, said safety shutoff and solenoid valves each seating with the flow through said valve body.

7. In a device of the class described, a valve body having inlet, outlet and intermediate chambers, a valve seat member through which said inlet chamber is adapted to communicate with said intermediate chamber, a port through which said intermediate chamber is adapted to communicate with said outlet chamber, a safety shutoff valve biased to a closed position and controlling the flow through said valve seat member, an electromagnet which, when energized, is adapted to hold said valve open, a pilot burner, a thermocouple subject to the heat of the pilot flame and connected in circuit with said electromagnet to energize same by the heat of the flame on the thermocouple, a solenoid valve controlling the flow through the port between the intermediate and outlet chambers, means for resetting the safety shutoff valve to open position, flow interrupter means movable in the resetting operation into engagement with the valve seat member between the inlet and intermediate chambers to shut off during the resetting operation the flow to said intermediate chamber and thereby the flow to said outlet chamber regardless of the position of said solenoid valve, a pilot supply pipe leading from said valve seat member between the ends thereof for supplying fuel to said pilot burner when the safety shutoff valve is open and the flow interrupter means is closed, and means for setting the solenoid valve in predetermined open position.

HENRY F. ALFERY.